(12) United States Patent
Pavlovic et al.

(10) Patent No.: US 8,408,944 B1
(45) Date of Patent: Apr. 2, 2013

(54) SCALABLE CONNECTION SYSTEM FOR PARALLEL WIRING CIRCUITS

(75) Inventors: Slobodan Pavlovic, Novi, MI (US); David Menzies, Linden, MI (US); Reinhard Pusch, Farmington Hills, MI (US); Michael Hardy, Ypsilanti, MI (US)

(73) Assignee: Lear Corporation, Southfield, MI (US)

( * ) Notice: Subject to any disclaimer, the term of this patent is extended or adjusted under 35 U.S.C. 154(b) by 7 days.

(21) Appl. No.: 13/285,645

(22) Filed: Oct. 31, 2011

(51) Int. Cl.
*H01R 25/00* (2006.01)

(52) U.S. Cl. ...................................... 439/638

(58) Field of Classification Search .................. 439/638, 439/626, 502–504, 34, 35, 723, 724, 949; 307/10.1, 9.1; 180/65.1, 65.21, 65.24; 318/139
See application file for complete search history.

(56) References Cited

U.S. PATENT DOCUMENTS

| | | | |
|---|---|---|---|
| 4,775,327 A * | 10/1988 | Normann et al. | 439/140 |
| 5,470,253 A * | 11/1995 | Siems et al. | 439/491 |
| 6,066,928 A | 5/2000 | Kinoshita et al. | |
| 6,545,861 B1 * | 4/2003 | Hayes et al. | 361/642 |
| 6,840,789 B2 * | 1/2005 | Shibata | 439/345 |
| 6,909,200 B2 * | 6/2005 | Bouchon | 307/10.1 |
| 6,991,476 B2 * | 1/2006 | Koerwer et al. | 439/76.2 |
| 7,084,361 B1 * | 8/2006 | Bowes et al. | 200/16 R |
| 7,310,242 B2 * | 12/2007 | Ramos et al. | 361/818 |
| 7,343,992 B2 * | 3/2008 | Shingo et al. | 180/65.1 |
| 7,352,143 B2 | 4/2008 | Inaba et al. | |
| 7,404,459 B2 | 7/2008 | Nakanishi et al. | |
| 7,439,631 B2 | 10/2008 | Endou | |
| 7,458,828 B2 | 12/2008 | Pavlovic | |
| 7,462,073 B2 * | 12/2008 | Bell et al. | 439/639 |
| 7,527,521 B2 * | 5/2009 | Rubin et al. | 439/505 |
| 7,613,003 B2 | 11/2009 | Pavlovic et al. | |
| 7,637,761 B1 * | 12/2009 | Arnold | 439/212 |
| 7,645,145 B2 * | 1/2010 | Soma et al. | 439/76.2 |
| 7,667,432 B2 | 2/2010 | West et al. | |
| 7,713,096 B2 | 5/2010 | Pavlovic et al. | |
| 7,841,911 B2 * | 11/2010 | Aizawa | 439/723 |
| 7,854,282 B2 | 12/2010 | Lee et al. | |
| 7,878,866 B1 | 2/2011 | Kwasny et al. | |
| 8,016,607 B2 | 9/2011 | Brown, II | |
| 8,028,780 B2 * | 10/2011 | Sagawa et al. | 180/65.27 |
| 8,038,465 B2 | 10/2011 | Pavlovic | |
| 8,057,239 B2 * | 11/2011 | Campbell et al. | 439/40 |
| 8,272,887 B2 * | 9/2012 | Fukuda et al. | 439/372 |
| 8,272,891 B2 * | 9/2012 | Kataoka et al. | 439/540.1 |
| 8,333,613 B2 * | 12/2012 | De Chazal et al. | 439/607.01 |
| 2004/0256142 A1 * | 12/2004 | Masuda et al. | 174/125.1 |
| 2005/0136733 A1 * | 6/2005 | Gorrell et al. | 439/502 |
| 2005/0253460 A1 | 11/2005 | Nakanishi et al. | |
| 2006/0216970 A1 | 9/2006 | Pavlovic | |
| 2006/0223385 A1 * | 10/2006 | Pavlovic et al. | 439/858 |
| 2007/0046417 A1 * | 3/2007 | Pavlovic et al. | 337/187 |

(Continued)

*Primary Examiner* — Alexander Gilman
(74) *Attorney, Agent, or Firm* — Brooks Kushman P.C.

(57) ABSTRACT

A high voltage connector system includes a first header for connection to a first electronic device, a first connector that connects to the first header, a second header that connects to a second electronic device, a second connector that connects to the second header, and a plurality of wires connecting the first connector and the second connector. The first header includes a first plurality of header terminals that are electrically connected together such that a high voltage electric current is divided into a plurality of sub-currents. The second header has a second plurality of header terminals that are electrically connected together such that the plurality of sub-currents are joined together to reform the first high voltage electric current.

11 Claims, 11 Drawing Sheets

U.S. PATENT DOCUMENTS

| | | | |
|---|---|---|---|
| 2007/0117453 A1* | 5/2007 | Pavlovic | 439/541.5 |
| 2009/0042436 A1* | 2/2009 | Emoto et al. | 439/502 |
| 2009/0242301 A1 | 10/2009 | McClanahan et al. | |
| 2011/0120787 A1 | 5/2011 | Lee et al. | |

* cited by examiner

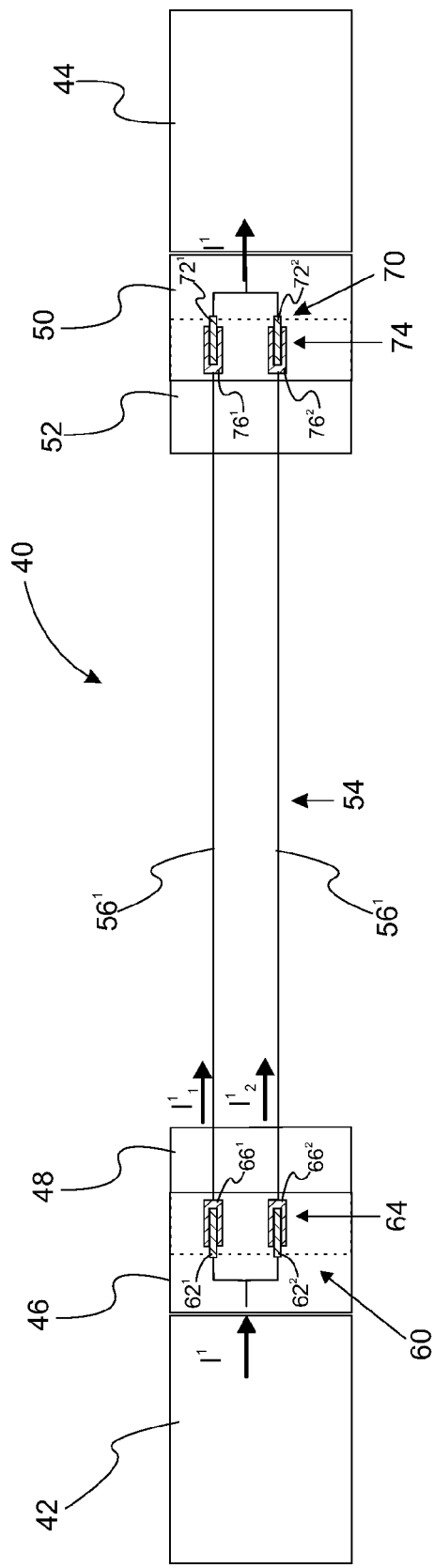
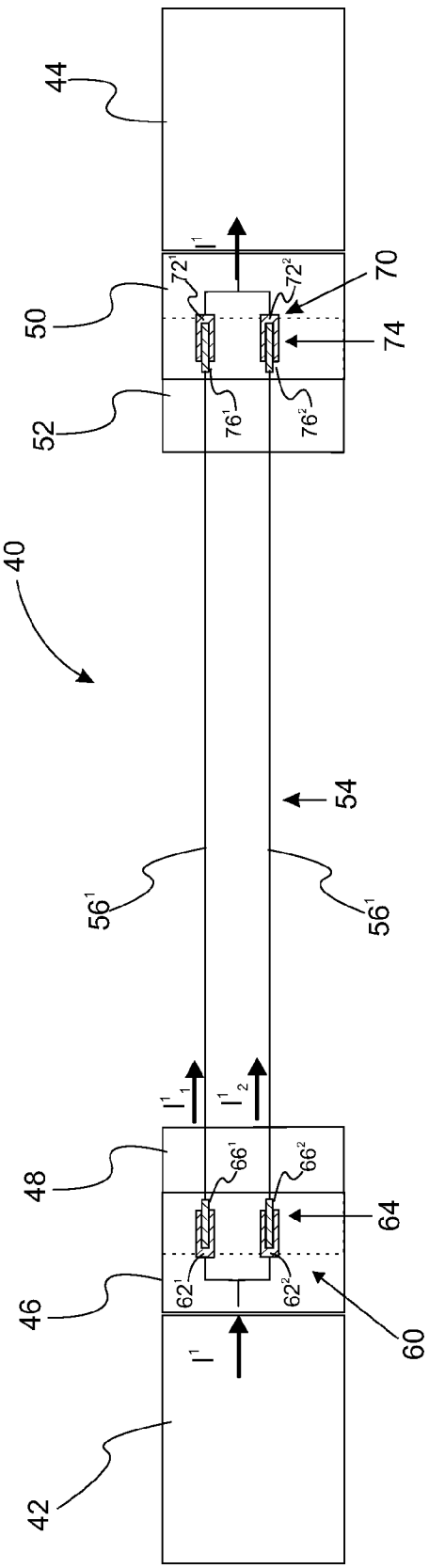
Fig. 2A
Fig. 2B

SCALABLE CONNECTION SYSTEM FOR PARALLEL WIRING CIRCUITS

BACKGROUND OF THE INVENTION

1. Field of the Invention

The present invention relates to electrical connection systems for high voltage applications, and in particular, to electrical connection systems used in hybrid electric vehicles.

2. Background Art

Electric vehicles and hybrid electric vehicles are becoming increasingly more popular. Such vehicles typically have a high voltage battery and an electric, battery driven motor. In addition, these vehicles usually include inverters, generators, distribution boxes, and other high voltage components.

Electric and hybrid electric vehicles require electrical connections systems that operate at high voltages and currents between 150 amps to 400 amps. Such connection systems typically include high gauge wiring that may be quite stiff rendering integration into such vehicles difficult. Thicker wires tend to be somewhat inefficient with respect to heat dissipation. The high current and heat requirements necessitate the use of copper wire which is both more expensive and heavier than metals such as aluminum. Weight reduction is particularly important in electric and hybrid electric vehicles Accordingly, there is a need for improved electrical connection systems for electric and hybrid electric vehicle applications.

SUMMARY OF THE INVENTION

The present invention solves one or more problems of the prior art, by providing in at least one embodiment, a high voltage connector system for electrically connecting electronic devices in an electric and/or hybrid electric vehicle. The system also includes a first header for connection to a first electronic device that outputs a first high voltage electric current, a first connector that connects to the first header, a second header for connection to a second electronic device that receives the first high voltage electric current, a second connector connects to the second header, and a plurality of wires connecting the first connector and the second connector. The first header includes a first plurality of header terminals that are electrically connected together such that the first high voltage electric current is divided into a plurality of sub-currents. The first connector has a first plurality of connector terminals such that each connector terminal in the first plurality of connector terminals electrically contacts a header terminal in the first plurality of header terminals. The second header has a second plurality of header terminals that are electrically connected together such that the plurality of sub-currents are joined together to reform the first high voltage electric current. The second connector includes a second plurality of connector terminals such that each connector terminal in the second plurality of connector terminals electrically contacts a header terminal in the second plurality of header terminals. Finally, each wire in the plurality of wires electrically connects a connector terminal in the first plurality of connector terminals to a connector terminal in the second plurality of connector terminals.

In another embodiment, a high voltage connector system is provided. The system also includes a first header for connection to the first high voltage electronic device that outputs a plurality of high voltage electric currents, a first connector that connects to the first header, a second header for connection to the second electronic device that receives the plurality of high voltage electric currents, a second connector that connects to the second header, and a plurality of wires. The first header includes a first plurality of header terminals. The header terminals in the plurality of header terminals are electrically connected together such that each high voltage electric current in the plurality of high voltage electric currents is divided into a set of sub-currents. The first connector includes a first plurality of connector terminals. Each connector terminal in the first plurality of connector terminals electrically contacts a header terminal in the first plurality of header terminals. The second header includes a second plurality of header terminals that are electrically connected together such that each set of sub-currents are joined together to reform the plurality of high voltage electric currents. The second connector includes a second plurality of connector terminals. Each connector terminal in the second plurality of connector terminals electrically contacts a header terminal in the second plurality of header terminals. Each wire electrically connects a connector terminal in the first plurality of connector terminals to a connector terminal in the second plurality of connector terminals.

Advantageously, the embodiments of the invention allow for the use of multiple smaller sized terminals and smaller sized multiple parallel wires to transfer a high current from one side of a serviceable interface to another. This is in contrast to the normal arrangement in which larger terminals and a single larger wire are used to deliver the same current. The use of smaller parallel wires of the same total cross sectional area as a given single larger wire, allows for better heat dissipation thereby allowing for the transfer of a higher current for the same temperature rise over ambient temperature than the single wire. In the case of AC currents, parallel wires of the same total cross sectional area as a given single larger wire have a larger effective cross sectional area due to the skin effect. Similarly, the use of smaller multiple terminals also allows for better heat dissipation by providing a larger heat dissipation surface and for a larger wire contact surface. Finally, the connection systems allow for easy implementation because of the relative ease in manipulating smaller wires.

BRIEF DESCRIPTION OF THE DRAWINGS

FIGS. 2A and 2B provide schematic illustrations of embodiments of a high voltage connector system;

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "high voltage current" as used herein refers to the current derived from a voltage of 100 volts or higher. The high voltage current is typically greater than or equal to 100 amps. In many applications, the high voltage current is from about 100 amps to about 600 amps or greater. It should be appreciated that higher currents require thicker wires and larger terminals.

Figure 1:
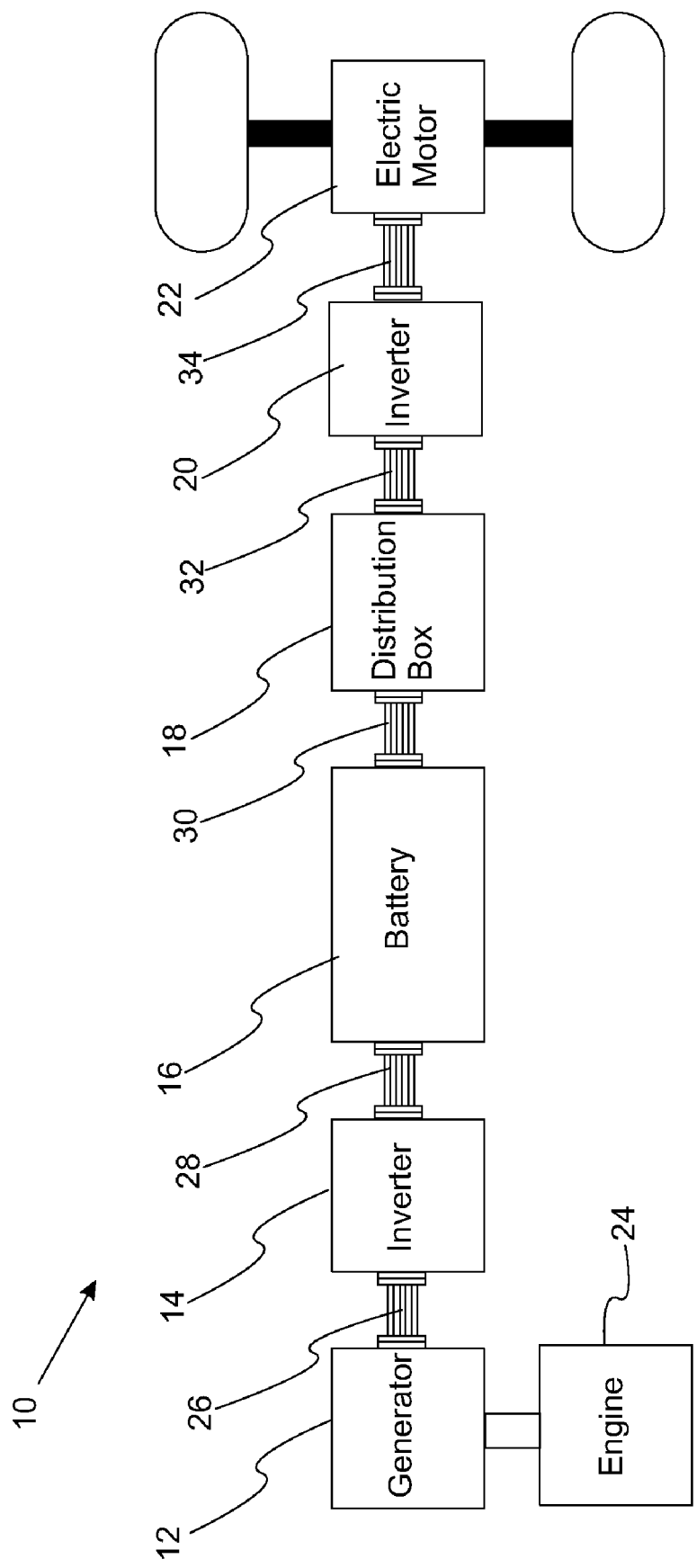
FIG. 1 is a schematic illustration of a hybrid electric vehicle incorporating an embodiment of a high voltage connector system.

With reference to FIG. 1, a schematic illustration of a hybrid electric vehicle incorporating an embodiment of a high voltage connection system is provided. Hybrid electric vehicle 10 includes electronic devices 12 through 22. Generator 12 is driven by gasoline engine 24 which is used to charge battery 16 via inverter 14. Similarly, battery 16 provides energy to electric motor 22 via inverter 20 by converting direct current (DC) into alternating current (AC). Typically, electric motor 22 is operated by three phase electric power. Distribution box 18 is used to provide power from battery 16 to various devices in the hybrid electric vehicle, including, but not limited to, inverter 20. Electronic devices 12 through 22 are electrically connected by connection systems 26 through 34 as depicted in FIG. 1. The details of high voltage connection systems that can be used for one or more of connection systems 26 through 34 are set forth below.

With reference to FIGS. 2A, 2B, 3A, 3B, 3C, and 3D, schematic illustrations depicting a high voltage connector system for electrically connecting electronic devices in a hybrid electric vehicle are provided. FIG. 2A is a schematic illustration of a high voltage connector system using male terminals in the headers and electrically connecting two electronic components. FIG. 2B is a schematic illustration of a high voltage connector system using female terminals in the headers and electrically connecting two electronic components. FIGS. 3A, 3B, 3C, and 3D provide schematic illustrations showing the connection of header terminals to connector terminals. High voltage connector system 40 electrically connects first electronic device 42 that outputs first high voltage electric current $I^1$ to second electronic device 44 that receives first high voltage electric current $I^1$. The current can be either DC or AC. Typically, first electronic device 42 and second electronic device 44 operate at voltages greater than about 100 V with currents from about 150 amps to about 600 amps or more. In a refinement, first electronic device 42 and second electronic device 44 operate at voltages greater than about 200 V. High voltage connector system 40 also includes first header 46 for connection to first electronic device 42, first connector 48 that connects to the first header, second header 50 for connection to second electronic device 44, second connector 52 connects to second header 50, and plurality 54 of wires. First header 46 includes first plurality 60 of header terminals $62^1$, $62^2$ that are electrically connected together such that first electric current $I^1$ is divided into a plurality of parallel sub-currents $I^1_1$, $I^1_2$. First connector 48 includes first plurality 64 of connector terminals $66^1$, $66^2$ such that each connector terminal in first plurality 64 of connector terminals electrically contacts a header terminal in first plurality 60 of header terminals. Second header 50 has second plurality 70 of header terminals $72^1$, $72^2$ that are electrically connected together such that plurality of sub-currents $I^1_1$, $I^1_2$ are joined together to reform the first electric current. Second connector 52 includes second plurality 74 of connector terminals $76^1$, $76^2$ such that each connector terminal in the second plurality of connector terminals electrically contacts a header terminal in the second plurality of header terminals. Finally, each wire $56^1$, $56^2$ in plurality 54 of wires electrically connects a connector terminal in the first plurality of connector terminals to a connector terminal in the second plurality of connector terminals.

Although FIGS. 2A and 2B depict an example in which first plurality 60 and second plurality 70 of header terminals and first plurality 66 and second plurality 76 of connection terminals each include only two terminals, it should be appreciated that virtually any number (n) of terminals can be utilized to divide $I^1$ into n sub-currents and then to recombine the n sub-currents. Typically, n is an integer from 2 to 20. In a refinement, n is 2 to 4.

In a refinement, the cross sectional area of wires $56^1$, $56^2$ is less than the cross sectional area of a single wire that is capable of carrying the first current from the first to the second electronic device. In general, the cumulative cross sectional area of wires $56^1$, $56^2$ is from 70% to about 130% of the cross sectional area of a single wire that is capable of carrying the first current from the first to the second electronic device. As set forth above, the use of smaller parallel wires of the same total cross sectional area as a given single larger wire, allows for better heat dissipation thereby allowing for the transfer of a higher current for the same temperature rise over ambient temperature than the single wire. In the case of AC currents, parallel wires of the same total cross sectional area as a given single larger wire have a larger effective cross sectional area due to the skin effect. Similarly, the use of smaller multiple terminals also allows for better heat dissipation by providing a larger heat dissipation surface and for a larger wire contact surface 2. Parallel wiring used in the high voltage connections systems allows that single copper wire of certain size can be replaced by two aluminum wires of the same cumulative cross section. In cases when a single copper wire is replaced with a single aluminum wire, the aluminum conductor size needs to be increased 50% in order to carry the same current. For example, a single 95 mm² copper wire is rated for 455 A continuous current while a single 59 mm² aluminum wire is rated for 255 A continuous current. Therefore, two aluminum wires can carry 510 A. From these specifications, a single copper wire carries 4.8 A/mm² while two aluminum wires carry 4.3 A/mm². Two aluminum wires with cumulative cross section of 95 mm² can carry 410 A versus 450 A for a copper wire. Therefore, the copper can be replaced with two aluminum wires of about the same cross sectional area. Finally, the connection systems allow for easy implementation because of the relative ease in manipulating smaller wires.

Figure 3A:
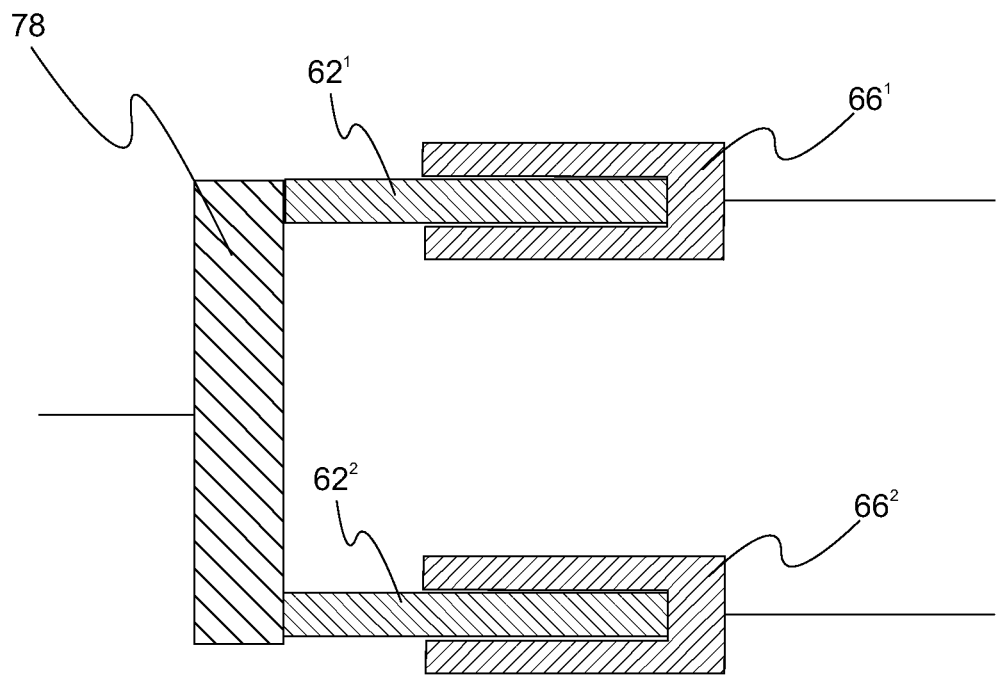
FIGS. 3A, 3B, 3C, and 3D provide schematic illustrations showing the connection of header terminals to connector terminals.
Figure 3B:
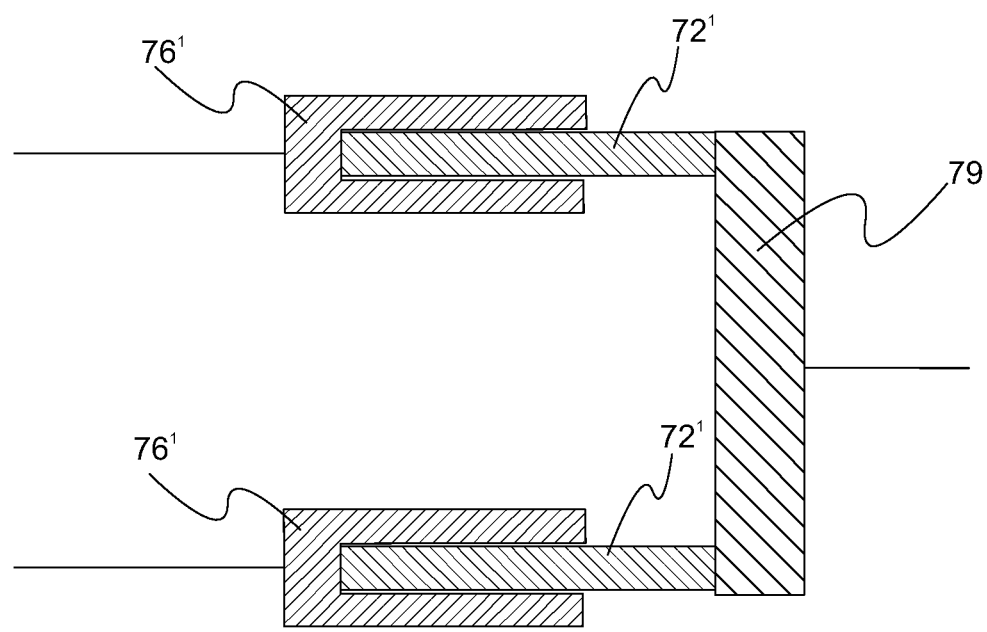
Figure 3C:
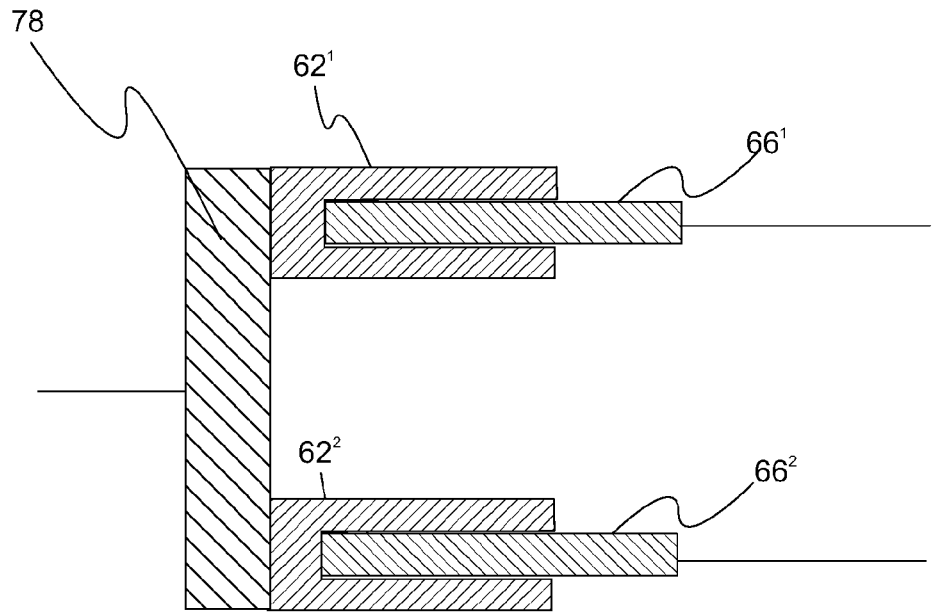
Figure 3D:
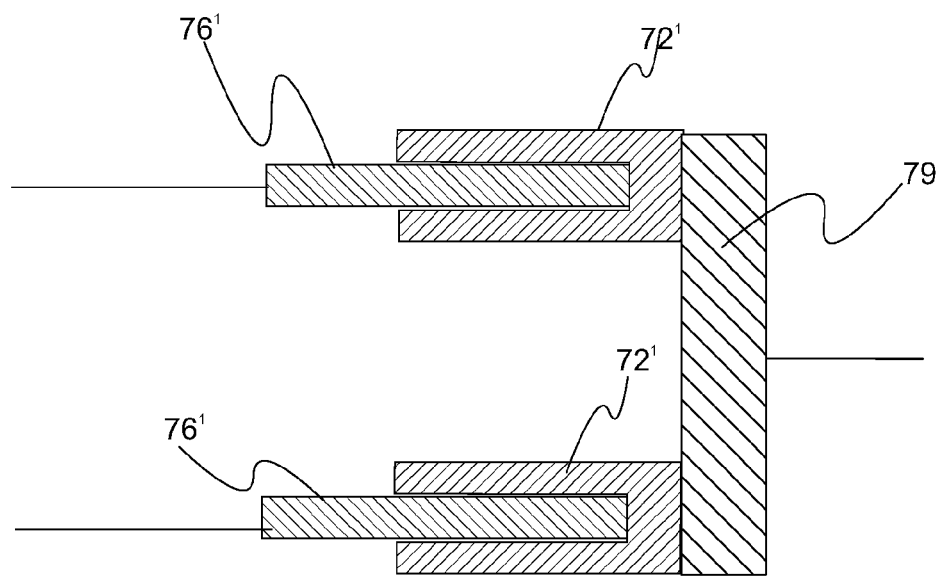

With reference to FIGS. 3A, 3B, 3C, and 3D, schematic illustrations of various header terminal and connector terminal configurations is provided. FIGS. 3A and 3B provide an example in which header terminals $62^1$, $62^2$, $72^1$, $72^2$ are male terminals while connector terminals $66^1$, $66^2$, $76^1$, $76^2$ are female terminals. FIGS. 3C and 3D provide an example in which header terminals $62^1$, $62^2$, $72^1$, $72^2$ are female terminals while connector terminals $66^1$, $66^2$, $76^1$, $76^2$ are male terminals. In general, it is preferred that the connector terminals are female connectors so that the terminals can be protectively positioned in the connector housing thereby providing straining/guiding features. In this variation, the header terminals are male connectors. Male terminals are formed from a single metal blade with female terminals contacting (i.e., mating with) such blades on both sides. In this variation, female terminals are terminated to a single wire with each individual circuit having a wire and female terminal on each end and carry a defined amount of current.

Still referring to FIGS. 3A, 3B, 3C, and 3D, metallic bus bar 78 is used to connect header terminals $62^1$ and $62^2$ together. Similarly, metallic bus bar 79 is used to connect header terminals $72^1$ and $72^2$ together. In configurations where the electric current is divided into more than 2 sub-currents, the bus bars will connect more than 2 header terminals.

Figure 4A:
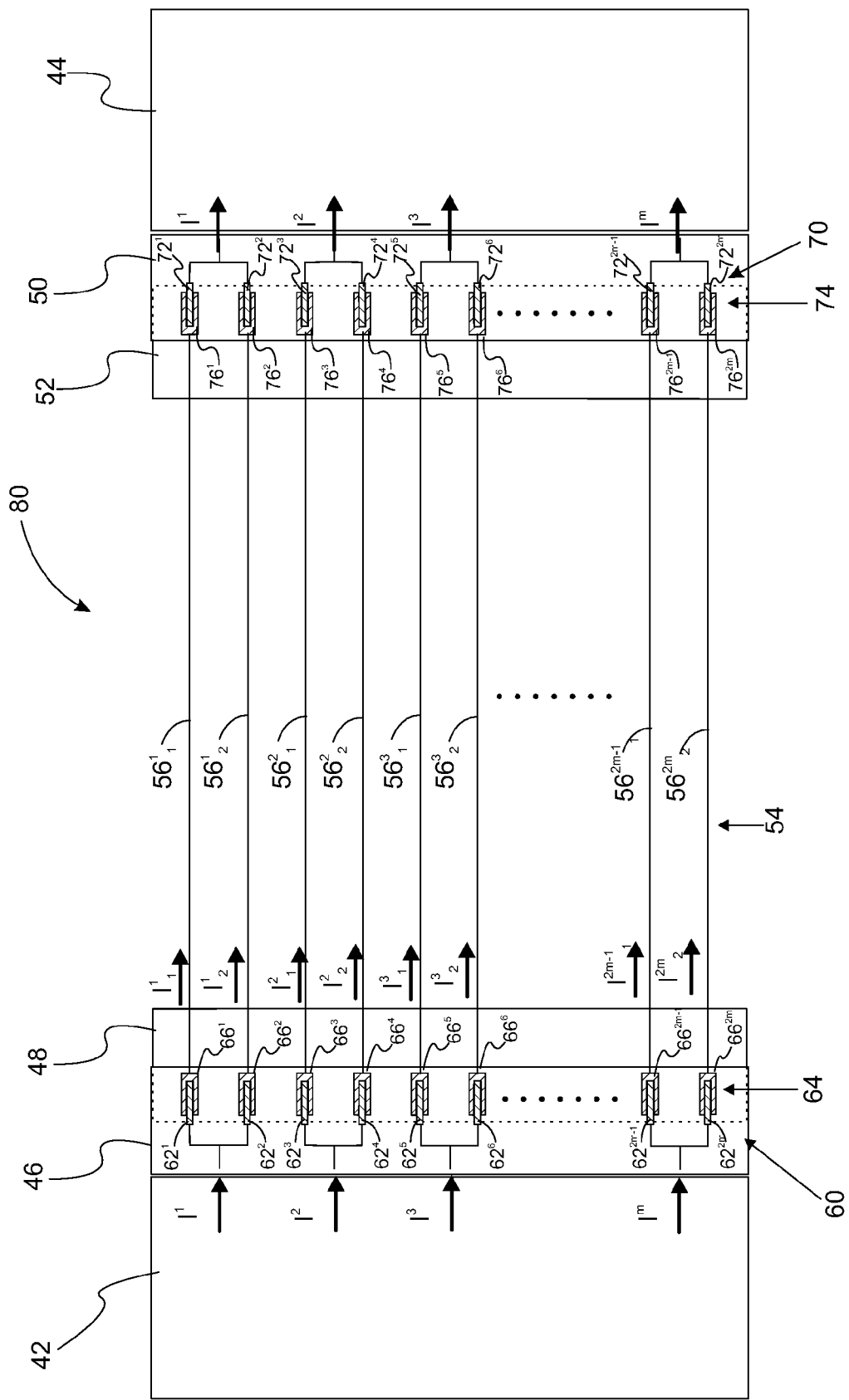
FIGS. 4A and 4B provide schematic illustrations of a high voltage connector system for connecting devices with a plurality of high voltage currents.
Figure 4B:
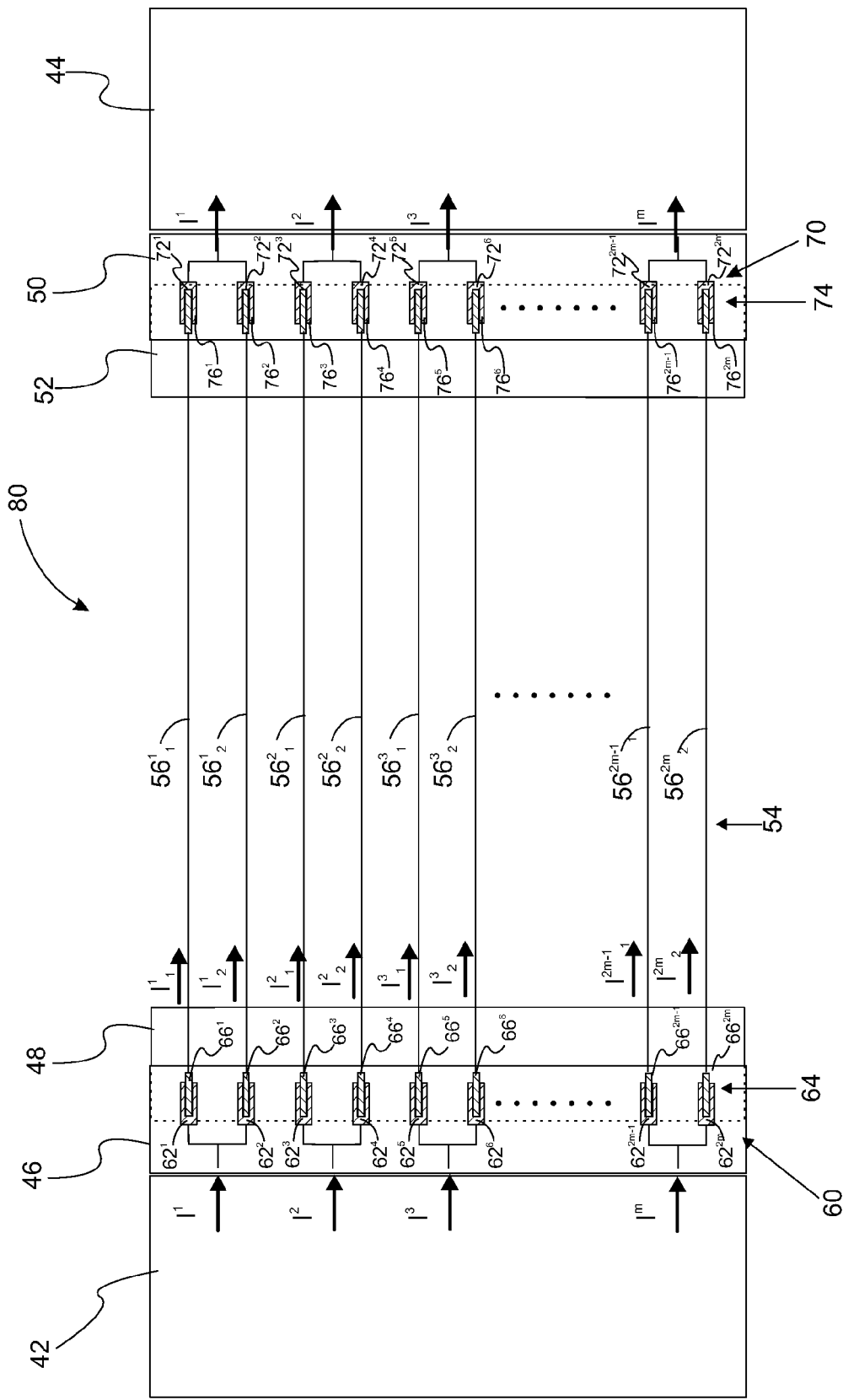

With reference to FIGS. 4A and 4B, a high voltage connector system is provided. FIG. 4A is a schematic illustration of a high voltage connector system using male terminals in the headers and electrically connecting two electronic components. FIG. 4B is a schematic illustration of a high voltage connector system using female terminals in the headers and electrically connecting two electronic components. High voltage connector system 80 electrically connects first electronic device 42 that outputs a plurality of high voltage electric currents $I^1$ though $I^m$ to second electronic device 44 that receives the plurality of high voltage electric currents $I^1$ though $I^m$. Typically, m is an integer from 1 to 20. In most variations, m is 1, 2, 3, 4, 5 or 6. The system includes first header 46 for connection to first electronic device 44, first connector 48 that connects to first header 46, second header 50 for connection to second electronic device 44, second connector 52 that connects to second header 50, and plurality of wires 54. First header 46 includes first plurality 60 of header terminals $62^1$ through $62^{2m}$. Sub-groups of header terminals $62^1$ through $62^{2m}$ are electrically connected together such that each high voltage electric current $I^m$ is divided into a set of parallel sub-currents $I^m_1$ through $I^m_s$, where s is an integer. Typically, s is 2, 3, or 4. In many applications, s is 2 as specifically depicted in FIG. 4. First connector 48 includes first plurality 64 of connector terminals $66^1$ through $66^{2m}$. Each connector terminal $66^1$ through $66^{2m}$ contacts a header terminal $62^1$ through $62^{2m}$. Second header 50 includes second plurality 70 of header terminals $72^1$ through $72^{2m}$. Sub-groups of header terminals $72^1$ through $72^{2m}$ are electrically connected together such that each set of sub-currents $I^m_1$ though $I^m_s$ are joined together to reform the plurality of high voltage electric currents $I^m$. Second connector 52 includes second plurality 74 of connector terminals $76^1$ through $76^{2m}$. Each connector terminal $76^1$ through $76^{2m}$ electrically contacts a header terminal $72^1$ through $72^{2m}$. Each wire $56^1$ though $56^{2m}$ electrically connects a connector terminal in first plurality 64 of connector terminals to a connector terminal in second plurality 74 of connector terminals.

Figure 5:
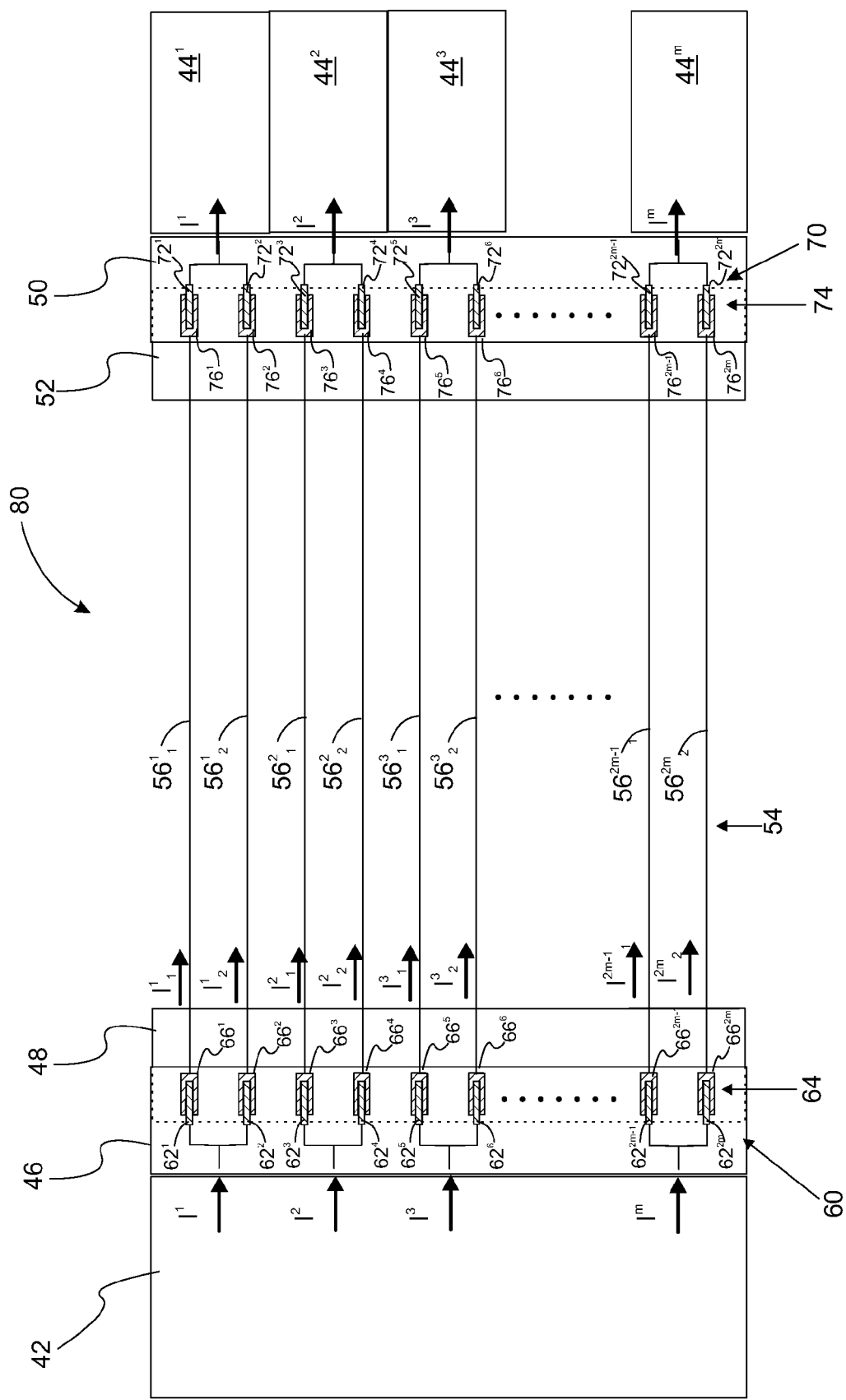
FIG. 5 is a schematic illustration of a high voltage connector system for connecting an electronic device to a plurality of other devices.

With reference to FIG. 5, a schematic illustration of a connector system connecting a first electronic device to a plurality of other devices is provided. In the present variation, connector system 80 connects first electronic device 42 to plurality of devices $44^1$ through $44^m$. It should be appreciated that the electrical connection of sub-groups of header terminals $62^1$ through $62^{2m}$ and sub-groups of header terminals $72^1$ through $72^{2m}$ can be accomplished using a bus bar as depicted in FIGS. 3A and 3B.

Figure 6:
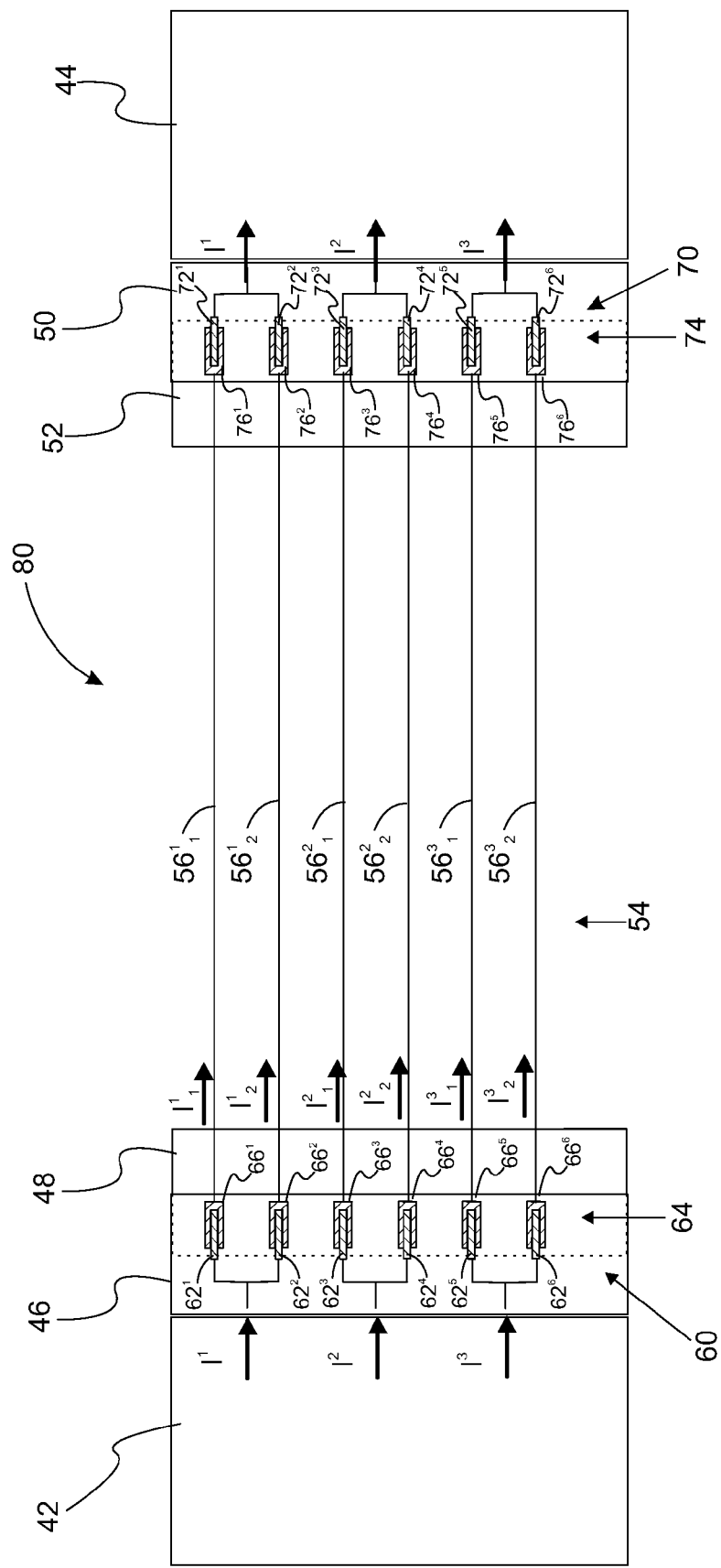
FIG. 6 is a schematic illustration of a high voltage connector system suitable for connecting three phase AC devices.

With reference to FIG. 6, a specific example of the connection system of FIGS. 4A and 4B suitable for connecting three-phase AC devices is provided. This example illustrates that at least six header terminals $62^1$ through $62^{2m}$ in first header 46, at least six header terminals $72^1$ through $72^{2m}$ in second header 50, at least six connector terminals $66^1$ through $66^{2m}$ in first connector 48, and at least six connector terminals $76^1$ through $76^{2m}$ in second connector 52 are necessary for connecting three phase devices 42 and 44.

Figure 7:
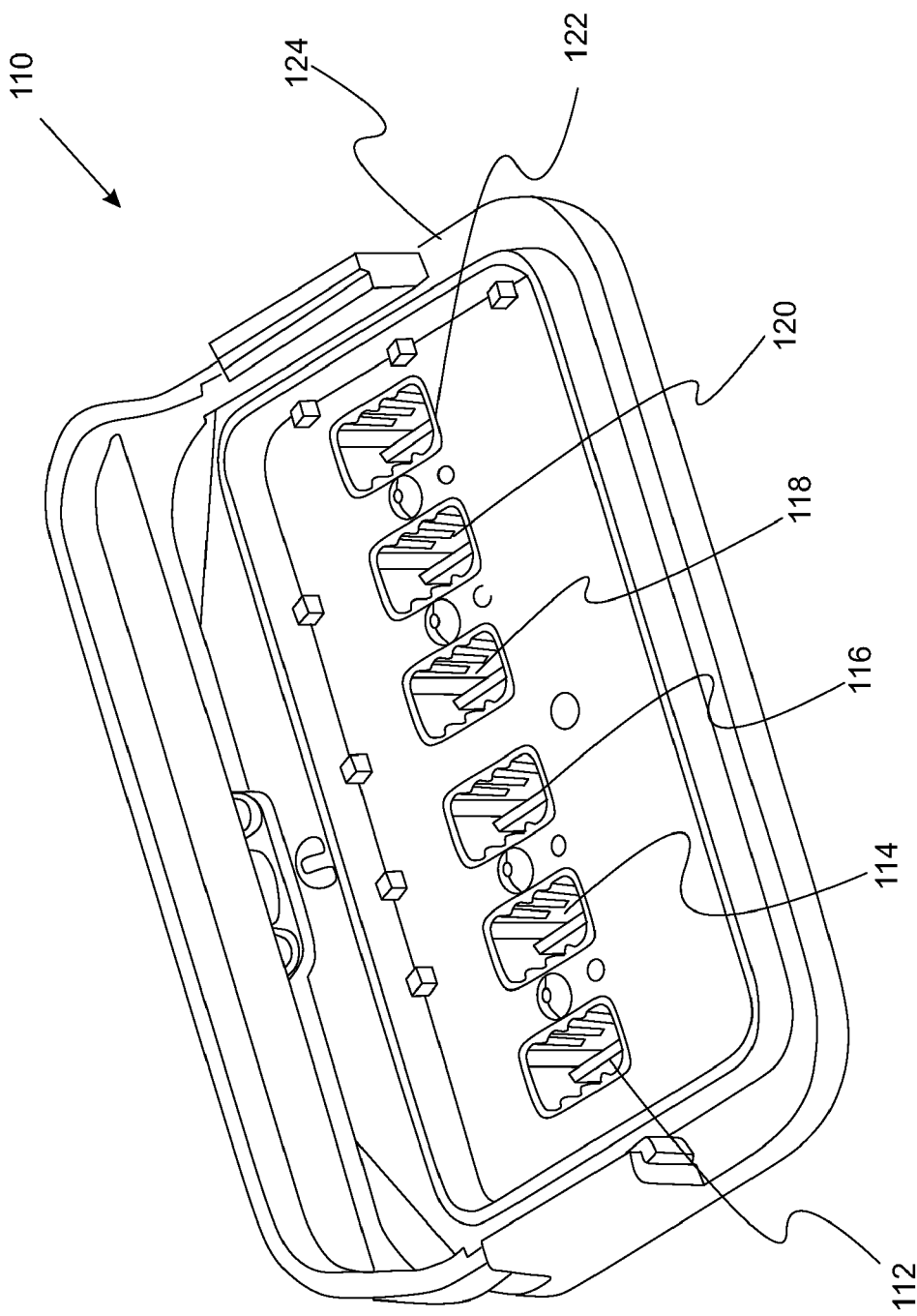
FIG. 7 is a perspective view of a header with six header terminals.
Figure 8:
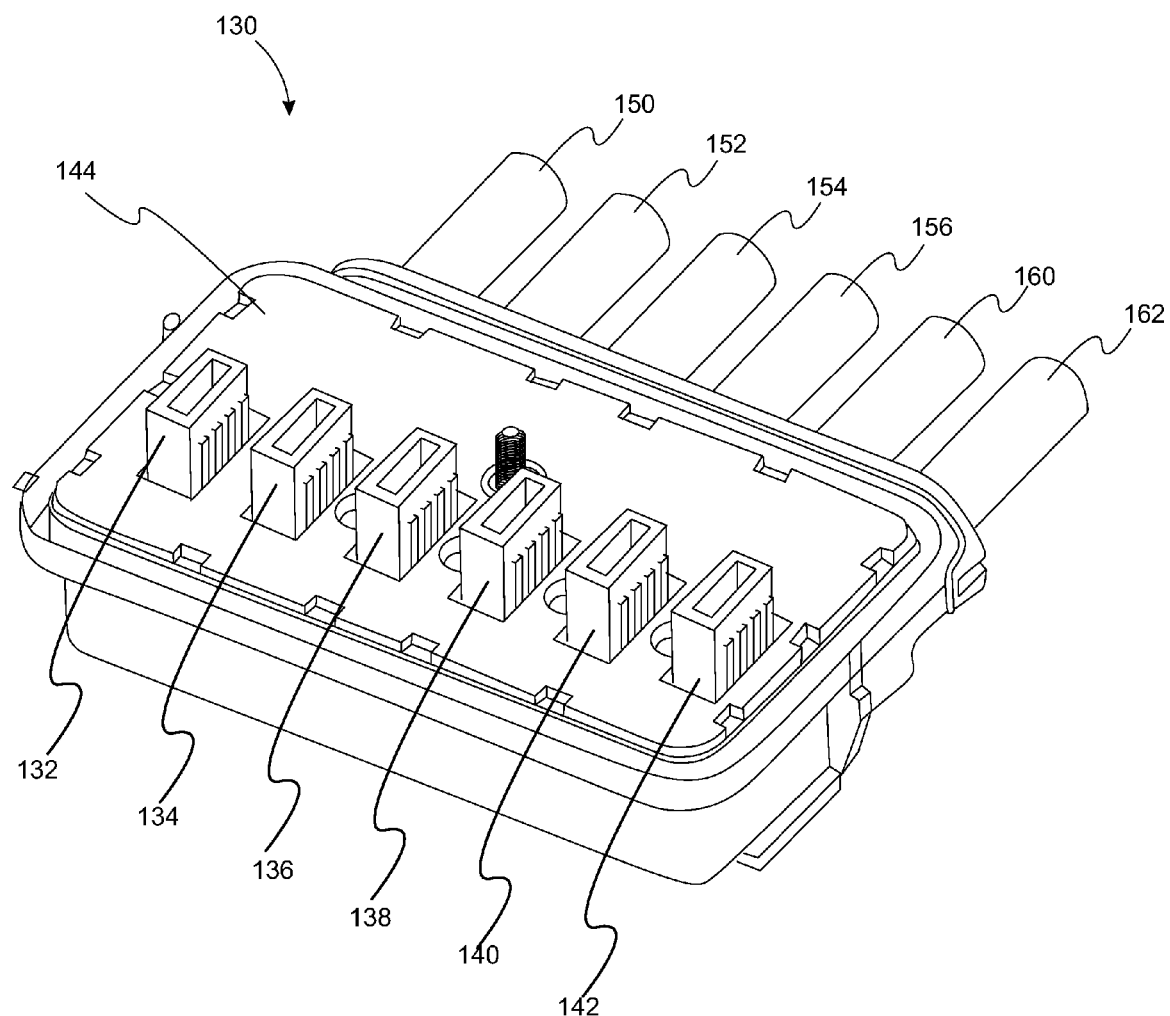
FIG. 8 is a perspective view of a connector with six connector terminals.

With reference to FIGS. 7 and 8, schematic illustrations of a header and connector each with six terminals are provided. Header 110 includes header terminals 112 through 122 which are mounted in recesses in housing 124. Header terminals 112 through 122 are of a male design. Connector 130 includes connector terminals 132 through 142 which are mounted in housing 144. Connector terminals 132 through 142 are of a female design. Wires 150 through 162 are in electrical communication with connector terminals 132 through 142.

Figure 9:
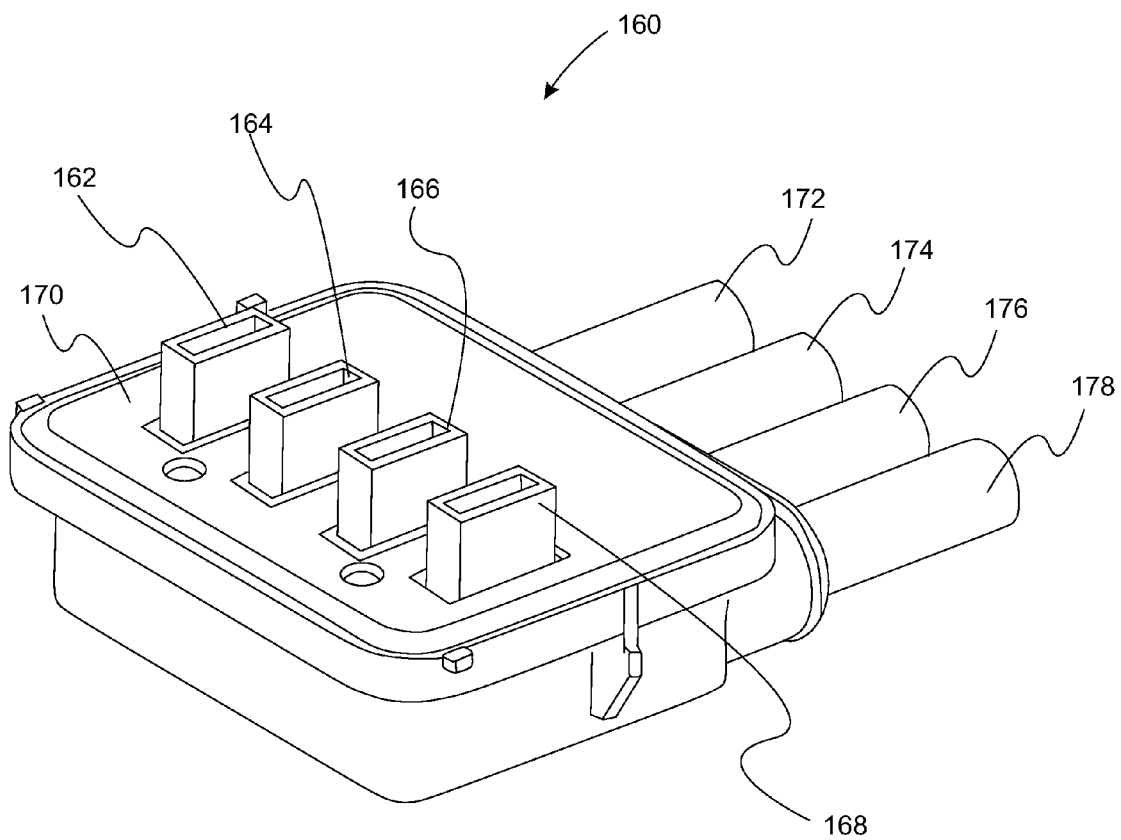
FIG. 9 is a perspective view of a connector with four connector terminals.

With reference to FIG. 9, a schematic illustration of a connector with four terminals is provided. Connector 160 includes connector terminals 162 through 168 which are mounted in housing 170. Connector terminals 162 through 168 are of a female design. Wires 172 through 178 are in electrical communication with connector terminals 132 through 142.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A high voltage connector system comprising:
   a first header for connection to a first electronic device, the first electronic device outputting a first high voltage electric current, the first header including a first plurality of header terminals that are electrically connected together such that the first electric current is divided into a plurality of sub-currents;
   a first connector that connects to the first header, the first connector including a first plurality of connector terminals, each connector terminal in the first plurality of connector terminals electrically contacting a header terminal in the first plurality of header terminals;
   a second header for connection to a second electronic device, the second electronic device receiving the first high voltage electric current, the second header including a second plurality of header terminals that are electrically connected together such that the plurality of sub-currents are joined together to reform the first electric current;

a second connector that connects to the second header, the second connector including a second plurality of connector terminals, each connector terminal in the second plurality of connector terminals electrically contacting a header terminal in the second plurality of header terminals; and a plurality of wires, each wire electrically connecting a connector terminal in the first plurality of connector terminals to a connector terminal in the second plurality of connector terminals.

2. The high voltage connector system of claim 1 wherein the plurality of wires includes aluminum wires.

3. The high voltage connector system of claim 1 wherein the first and second plurality of connector terminals each independently include female connection terminals and the first and second plurality of header terminals each independently include male connection terminals.

4. The high voltage connector system of claim 1 wherein the first and second plurality of connector terminals each independently include male connection terminals and the first and second plurality of header terminals each independently include female connection terminals.

5. The high voltage connector system of claim 1 wherein the cross sectional area of each wire in the plurality of wires is less than the cross sectional area of a single wire that is capable of carrying the first current from the first to the second electronic device.

6. The high voltage connector system of claim 1 wherein the first high voltage current is a DC current or an AC current.

7. The high voltage connector system of claim 1 wherein the first high voltage current is divided into 2 sub-currents.

8. The high voltage connector system of claim 6 wherein the first and second plurality of connector terminals each independently consists of two connector terminals and the first and second plurality of header terminals each independently consist of two header terminals.

9. The high voltage connector system of claim 1 wherein the first electronic device outputs a plurality of high voltage currents.

10. The high voltage connector system of claim 9 configured to connect the first electronic device to a plurality of other devices.

11. A high voltage connector system comprising:

a first header for connection to a first electronic device, the first electronic device outputting a plurality of high voltage electric currents, the first header including a first plurality of header terminals, the header terminals in the plurality of header terminals are electrically connected together such that each high voltage electric current is divided into a set of sub-currents;

a first connector that connects to the first header, the first connector including a first plurality of connector terminals, each connector terminal in the first plurality of connector terminals electrically contacting a header terminal in the first plurality of header terminals;

a second header for connection to a second electronic device, the second electronic device receiving the plurality of high voltage electric currents, the second header including a second plurality of header terminals that are electrically connected together such that each set of sub-currents are joined together to reform the plurality of high voltage electric currents;

a second connector that connects to the second header, the second connector including a second plurality of connector terminals, each connector terminal in the second plurality of connector terminals electrically contacting a header terminal in the second plurality of header terminals; and a plurality of wires, each wire electrically connecting a connector terminal in the first plurality of connector terminals to a connector terminal in the second plurality of connector terminals.

\* \* \* \* \*